United States Patent [19]

Furukawa

[11] 3,920,909

[45] Nov. 18, 1975

[54] AUTOMATIC TELEPHONE ANSWERING METHOD AND APPARATUS

[75] Inventor: Hajime Furukawa, Tokyo, Japan

[73] Assignee: Pioneer Electronic Corporation, Tokyo, Japan

[22] Filed: July 24, 1973

[21] Appl. No.: 382,223

[30] Foreign Application Priority Data

July 24, 1972 Japan .............................. 47-73393

[52] U.S. Cl. ...................... 179/6 R; 179/100.1 VC

[51] Int. Cl.[2] ........................................ H04M 1/64

[58] Field of Search......... 179/6 R, 6 AC, 100.1 VC

[56] References Cited

UNITED STATES PATENTS

| | | | |
|---|---|---|---|
| 2,946,852 | 7/1960 | Brown et al. | 179/6 R |
| 3,784,721 | 1/1974 | Kilby | 179/6 R |
| 3,786,191 | 1/1974 | Nagasawa et al. | 179/6 R |

*Primary Examiner*—Bernard Konick
*Assistant Examiner*—Stewart Levy
*Attorney, Agent, or Firm*—Sughrue, Rothwell, Mion, Zinn & Macpeak

[57] ABSTRACT

In order to avoid unnecessary use of telephone circuits, a recorded answering message advises a calling party to transmit a voice signal within a short time period after hearing a beep tone if the party wishes to have his message recorded. If the party here hangs up his telephone handset or otherwise does not transmit the required signal, the automatic answering apparatus is immediately returned to its standby state to await the next call, thereby freeing the telephone circuit. If the required signal is transmitted by the calling party, an incoming message recording tape is placed in a recording state for a predetermined time period in order to record the party's message.

3 Claims, 1 Drawing Figure

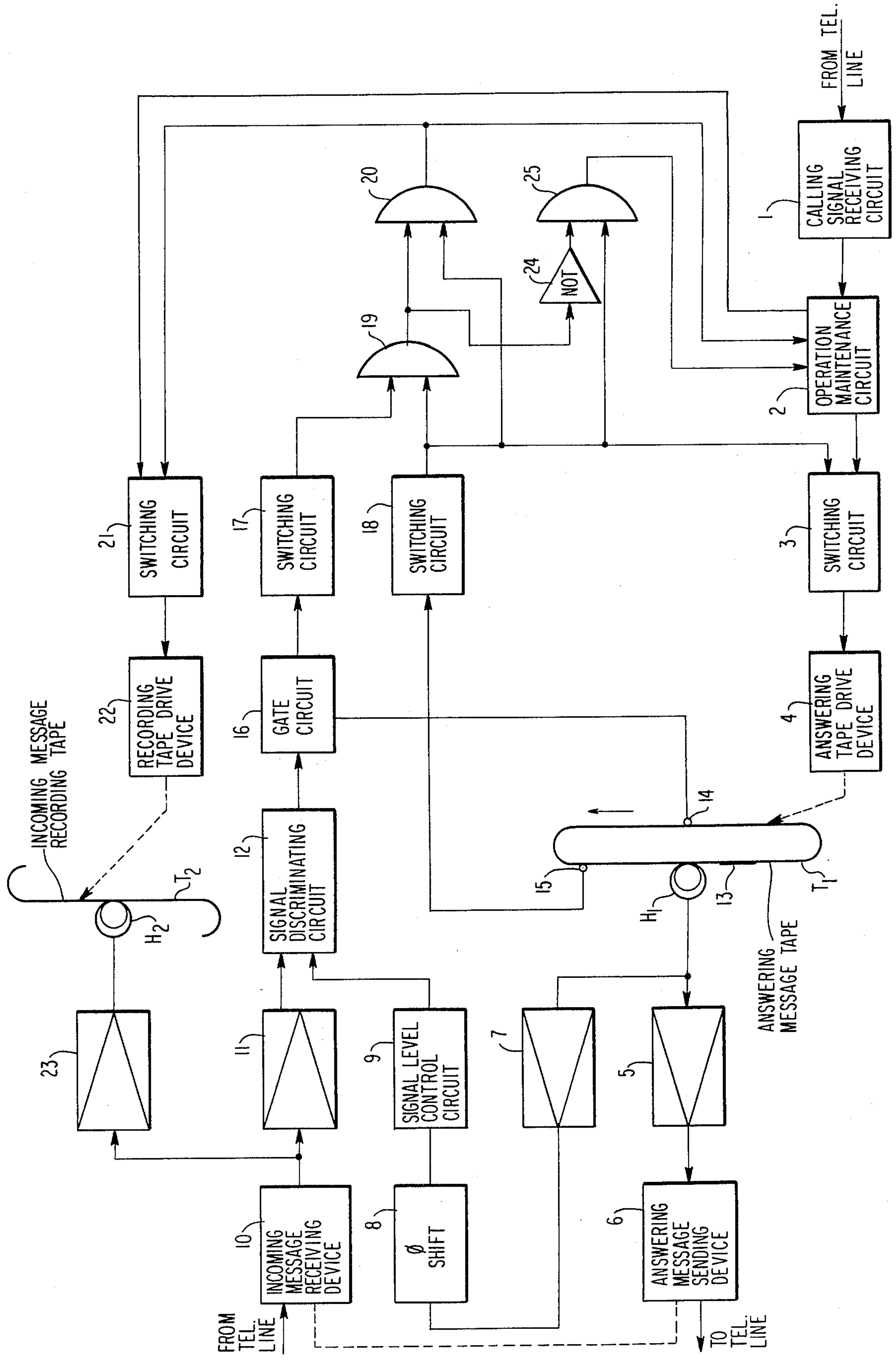
FROM TEL. LINE
CALLING SIGNAL RECEIVING CIRCUIT
OPERATION MAINTENANCE CIRCUIT
NOT
SWITCHING CIRCUIT
SWITCHING CIRCUIT
SWITCHING CIRCUIT
SWITCHING CIRCUIT
RECORDING TAPE DRIVE DEVICE
GATE CIRCUIT
ANSWERING TAPE DRIVE DEVICE
INCOMING MESSAGE RECORDING TAPE
SIGNAL DISCRIMINATING CIRCUIT
ANSWERING MESSAGE TAPE
SIGNAL LEVEL CONTROL CIRCUIT
INCOMING MESSAGE RECEIVING DEVICE
Ø SHIFT
ANSWERING MESSAGE SENDING DEVICE
FROM TEL. LINE
TO TEL. LINE

AUTOMATIC TELEPHONE ANSWERING METHOD AND APPARATUS

BACKGROUND OF THE INVENTION

1. Field of the Invention

The present invention relates to the field of automatic telephone answering apparatus and, more particularly, to an improved method and apparatus for controlling the answering operation in response to a calling party's incoming signal.

2. Description of the Prior Art

Automatic telephone answering apparatus of the so-called voice-operation type is already known and functions to restore the apparatus to a standby state when no message signal is received from a calling party during a predetermined time period, e.g. 10 seconds. This function may fairly well prevent an incoming message recording tape from being needlessly operated and a telephone circuit from being needlessly occupied for a long time. However, when a calling party hangs up his handset during the transmission to him of a recorded answering message, the incoming message recorder is still maintained in the recording state during the aforementioned predetermined time period, i.e. 10 seconds, whereby the incoming message recording tape runs without recording any incoming message, and the telephone circuit is needlessly occupied.

SUMMARY OF THE INVENTION

The present invention is directed to removing this disadvantage of the prior art apparatus.

Therefore, one object of the present invention is to provide an automatic telephone answering method and apparatus wherein an incoming message recording tape is not operated at all when no incoming message is actually received from a calling party.

Another object of the present invention is to provide an automatic telephone answering method and apparatus wherein, when there is no incoming message from a calling party, the telephone talking circuit may be immediately interrupted after the end of the transmission of an answering message, rather than at the end of a predetermined time in which the apparatus is in a recording state for recording an incoming message from the calling party.

BRIEF DESCRIPTION OF THE DRAWING

The single FIGURE is a schematic block diagram showing one embodiment of the present invention.

DETAILED DESCRIPTION OF THE PREFERRED EMBODIMENT

A calling-signal receiving device 1 receives a calling signal from a telephone line. An operation maintenance circuit 2 starts to operate in response to an output signal from the calling signal receiving device 1 and maintains the whole apparatus in the answering operation state during a predetermined time period. A switching circuit 3 activates an answering tape drive device 4 in response to an output signal from the operation maintenance circuit 2. An answering message recorded tape T1 is transported or run by the operation of the answering tape drive device 4.

A magnetic reproducing head H1 reproduces an answering message prerecorded on the answering tape T1, and an amplifier 5 amplifies the signal produced by the reproducing head H1. An answering message sending device 6 sends out the reproduced answering message to a calling party via the telephone line. An amplifier 7 amplifies a part of the signal produced by reproducing head H1, and a phase-shift circuit 8 shifts the phase of the output signal of amplifier 7. Signal level control circuit 9 controls the level of the output signal from the phase shift circuit 8. An incoming message receiving device 10 receives an incoming message from a calling party via the telephone line, and an amplifier 11 amplifies the output signal from the incoming message receiving device 10. A signal discriminating circuit 12 mixes the output signals from both the amplifier 11 and the signal level control circuit 9 and discriminates between a signal formed by a mixing of a signal from the answering message sending device 6 and the signal from the incoming message receiving device 10 and a signal formed by the mixing of the signal from the incoming message receiving device 10 and a signal from a calling party.

A conductive foil 13 is fixed on the answering tape T1, and sensing devices 14 and 15 detect the passing of the conductive foil 13. A gate circuit 16 passes an output signal from the signal discriminating circuit 12 only during a predetermined time period when the sensing device 14 detects the passing of the conductive foil 13. A switching circuit 17 is activated in response to an output signal from the gate circuit 16. A switching circuit 18 is activated when the sensing device 15 detects the passing of the conductive foil 13.

An AND circuit 19 generates an output signal only when it is receiving output signals from both switching circuits 17 and 18. An AND circuit 20 generates an output signal only when it is receiving output signals from both switching circuit 18 and AND circuit 19. A switching circuit 21 is actuated by an output signal from the AND circuit 20 to activate a recording tape drive device 22 which transports or runs an incoming message recording tape T2. An amplifier 23 amplifies an output signal from the answering message receiving device 10 in order to record the amplified signal on the recording tape T2 by means of a magnetic recording head H2. A NOT circuit 24 produces an output signal only when there is no output signal from the AND circuit 19. An AND circuit 25 generates an output signal only when receiving output signals from both the switching circuit 18 and the NOT circuit 24.

Next, the operation of the embodiment described above will be explained in detail.

When a calling signal from the telephone line comes into the apparatus, the calling signal receiving device 1 receives this calling signal, rectifies it, and causes it to charge a capacitor. The device 1 then generates a pulse signal, for example by inverting an operating state of a Schmitt trigger circuit when the capacitor is charged up to a predetermined voltage after about 3 to 10 seconds. Upon receiving this pulse signal, the operation maintenance circuit 2 begins to operate, whereby the whole apparatus is changed from the standby state to the answering operation state and then is maintained in the answering state during a predetermined time period.

When the switching circuit 3 is operated by the operation of the operation maintenance circuit 2, the answering tape drive device 4 starts operating to transport the answering tape T1. The answering message prerecorded on the answering tape T1 is reproduced by the reproducing head H1, amplified by the amplifier 5, and sent out to the calling party via the answering message sending device 6 and the telephone circuit. This answering message is also applied to the amplifier 7 and amplified. The amplified signal is then shifted by 180° in phase by the phase-shift circuit 8, subsequently controlled to an adequate voltage level by the signal level control circuit 9, and then applied to the signal discriminating circuit 12.

Furthermore, in an apparatus of the so-called indirect type wherein the calling signal receiving device 1, the answering message sending device 6 and the incoming message receiving device 10 are not connected directly to the telephone circuit, the output signal from the answering message sending device 6 is mixed acoustically or magnetically in the incoming message receiving device 10 by way of a speaker, a microphone or an induction coil. In an apparatus of the so-called direct type wherein all the aforementioned devices 1, 6 and 10 are directly connected to the telephone circuit, the output signal of the answering message sending device 6 is intermixed into the incoming message receiving device 10 directly or through a matching transformer. Consequently, when the answering message is being sent out, both the voice signal from the calling party and the answering message signal are applied to the incoming message receiving device 10. Both of these signals are amplified by the amplifier 11 and then applied to the signal discriminating circuit 12. Since the answering message signal is also applied to the signal discriminating circuit 12 through the phase shift circuit 8 and the signal level control circuit 9, and since this signal is shifted to an inverse phase with respect to the corresponding voltage levels in the answering message signal appearing on the output of the amplifier 11, the answering message signal is cancelled, and the output signal from the signal discriminating circuit 12 contains only the signal received from the calling party.

On the answering tape T1 are recorded, first, a message saying that the subscriber or the owner of the apparatus is not at home and, subsequently, a message saying that "After hearing a first signal, please transmit a signal (for instance, a voice signal) within 3 seconds after hearing the first signal if you want to have a message recorded. As soon as you hear a subsequent second signal, please transmit your message within the following 30 second period." When the conductive foil 13 passes through the sensing device 14, the gate circuit 16 opens its gate for 3 seconds in order to feed the output signal of the signal discriminating circuit 12 to the switching circuit 17 which is thereby activated. However, if the calling party has hung up his handset or does not transmit a signal while the gate is open, the switching circuit 17 is not activated and does not produce an output signal even though the gate is opened.

When the conductive foil continues to be transported and passes through the sensing device 15, the switching circuit 18 operates to generate an output signal. Upon receiving this output signal, the switching circuit 3 stops operating and thereby stops the operation of the answering tape drive device 4. Therefore, the answering tape T1 stops running. In addition, for transmitting the abovementioned first and second signals (e.g. beep tones) just before the conductive foil 13 reaches the sensing devices 14 and 15, respectively, both signals may be recorded at appropriate positions on the answering tape T1 to cooperate with additional sensing devices located just before the sensing devices 14 and 15 so that an oscillating circuit may be activated each time the conductive foil 13 passes devices 14 and 15 to generate an audio beep tone.

Furthermore, in the case where the calling party has already hung up the handset of his telephone when the gate circuit 16 opens its gate, the dial tone signal or the busy tone signal is likely to appear at the apparatus. It is preferable to design the signal discriminating circuit 12 such that the switching circuit 17 is not mistakenly operated by these signals or other noise signals. Still further, if no signal or noise is recorded on the answering tape T1 while the gate circuit 16 opens its gate, the amplifier 7, the phase shift circuit 8 and the signal level control circuit 9 may be omitted. However, as unexpected sounds, such as background noises, are likely to be recorded on the answering tape T1, the apparatus of the present embodiment is preferable for reliability of operation and to facilitate the recording operation.

When a signal from the calling party is received by the apparatus while the gate of gate circuit 16 is open, the switching circuit 17 is activated, and switching circuit 18 is activated when foil 13 passes under sensor 15; therefore, both switching circuits will generate output signals simultaneously, and thus both the AND circuit 19 and 20 generate respective output signals.

In response to the output signal from the AND circuit 20, the operation maintenance circuit 2 continuously maintains the whole apparatus in the answering state for a predetermined period, for example, about 30 seconds. At the same time, the switching circuit 21 is operated by the output from AND circuit 20 to activate the incoming message tape drive device 22 in order to transport the incoming message recording tape T2. Messages from the calling party are recorded on the recording tape T2 through the incoming message receiving device 10, the amplifier 23, and the recording head H2. The operation maintenance circuit 2 stops operating after the predetermined time period and returns the whole apparatus to the standby state to wait for the next call.

When no signal from the calling party is received by the apparatus while the gate of gate circuit 16 is open, the AND circuits 19 and 20 do not generate output signals, because the switching circuit 17 is not activated and does not generate an output signal, and the switching circuit 18 does not generate an output signal until the answering tape T1 has finished running. However, when the conductive foil passes under sensor 15 to indicate the end of the answering message, switching circuit 18 is activated to produce an output signal. Since NOT circuit 24 also generates an output signal, the AND circuit 25 generates an output signal which causes the operation maintenance circuit 2 to be stopped, and the whole apparatus to be returned to the standby state.

According to the present invention as explained above, the incoming message recording tape is not transported at all when there is no message of the calling party to be recorded, because the apparatus detects whether there is a message to be recorded or not before forming the recording state for recording an incoming message from the calling party. Furthermore, the telephone circuit, i.e. the talking circuit thereof, is not unnecessarily closed and used, because the apparatus opens the talking circuit of the telephone immediately after the termination of the answering message transmission operation and returns to the standby state to wait for the next new call.

While the invention has been particularly shown and described with reference to the preferred embodiment thereof, it will be understood by those skilled in the art that various changes in form and details may be made therein without departing from the spirit and scope of the invention.

I claim:

1. In an automatic telephone answering apparatus which is normally in a standby state for receiving a calling signal and which includes starting means for completing a telephone line talking circuit in response to a calling signal, answering means for sending out an answering message to a calling party, and recording means for recording an incoming message from the calling party, the improvement:

a. wherein the answering message contains a message portion advising the calling party to utter a specified signal within a following first predetermined time period if he wishes to have a message recorded; and comprising b. signal detecting circuit means coupled to said recording means and responsive to the occurrence of said specified signal during said first predetermined time period for maintaining the completion of said talking circuit and placing said recording means in an incoming message recording state, during a following second predetermined time period, to record the calling party's incoming message only if said specified signal occurs within said first predetermined time period.

2. The improvement defined in claim 1 wherein said signal detecting circuit means comprises additional circuit means responsive to the absence of said specified signal within said first predetermined time period for immediately returning said apparatus to said standby state without placing said recording means in the recording state.

3. In an automatic telephone answering method wherein a recorded answering message is transmitted over a telephone line circuit in response to a calling signal from a calling party and wherein a message from the calling party may be subsequently recorded, the improvement comprising:

a. including within the recorded answering message a message portion advising the calling party to utter a specified signal within a first predetermined time period if he wishes to have a message recorded;

b. immediately interrupting the talking circuit if the specified signal does not occur within the first predetermined time period; and c. maintaining the talking circuit and recording the calling party's message during a following second predetermined time period only if the specified signal occurs within the first predetermined time period.

* * * * *